July 11, 1933.  C. WIEHAGEN  1,918,202
WOOD DRILL WITH CUTTER TRANSVERSELY ADJUSTABLE IN THE DRILL SHANK
Filed May 20, 1932

UNITED STATES PATENT OFFICE

CARL WIEHAGEN, OF SOLINGEN-WALD, GERMANY

WOOD DRILL WITH CUTTER TRANSVERSELY ADJUSTABLE IN THE DRILL SHANK

Application filed May 20, 1932, Serial No. 612,547, and in Germany May 27, 1931.

Wood drills are known in which an inclined circular or flat blade is shiftable and fixable in the drill shank.

It is also known, in connection with wood drills, to provide flat blades transversely adjustable in the bore shank with teeth on their edge in which teeth a screw rotatable in the bore shank engages for effecting the displacement.

The production of such positively adjustable blades is the more complicated and difficult the smaller the diameter of the desired hole to be drilled is.

The invention relates to a wood drill which differs from the drills of known construction in that the blade itself is constructed as a screw, is adjustable in transverse direction by turning in a female screw thread in the shank of circular cross section and is automatically brought into the proper cutting position and fixed in this position by means of a set screw inserted in the end of the shank and acting on a flat portion of the circumference of the screw.

The blade in screw-shape is easy to produce and easy to adjust.

An embodiment of the invention is illustrated by way of example in the accompanying drawing in which.

Figure 1:
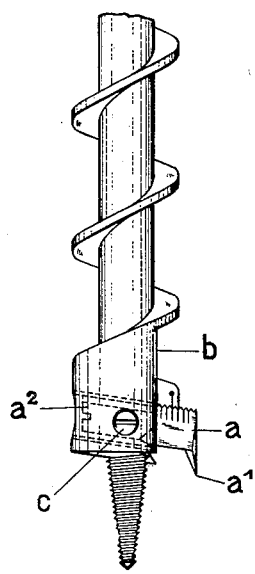
Fig. 1 shows the drill in elevation.
Figure 2:
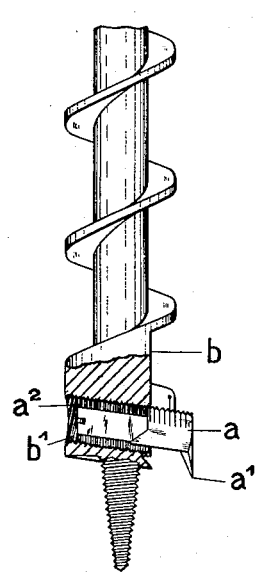
Fig. 2 is a similar view to Fig. 1, the end of the drill shank being in vertical cross section.
Figure 3:
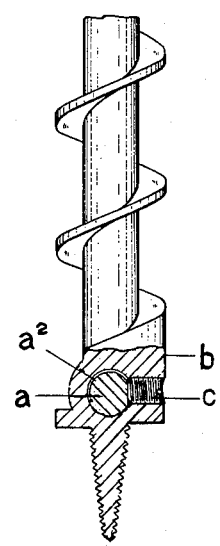
Fig. 3 is an elevation partly in section seen at right angles to Figs. 1 and 2.

The adjustable blade $a$ provided with a cutter $a'$ merges into a screw $a^2$ by means of which it is screwed into a female screw thread in a hole $b'$ in the drill shank $b$ so that by rotating the screw $a^2$ the blade is adjusted in transverse direction. The pitch of the fine thread of the screw $a^2$ and of the hole $b'$ do not allow accidental shifting of the blade during the drilling operation, and a set screw $c$ in the drill shank $b$ acting against the screw $a'$ prevents an unintentional turning of the screw $a^2$. The fine screw thread of the screw $a^2$ and of the hole $b'$ in the shank $b$ is preferably of such pitch that, in the case of metric screw thread, the blade $a$ is shifted a certain distance, for example ½ mm, during a full revolution of the screw $a^2$. The hole $b'$ in the shank $b$ is inclined so that the cutter $a'$ of the blade $a$ is free to cut.

I claim:—

A wood drill, comprising in combination a drill shank having a screw threaded transverse bore, a screw having a flattened portion shiftable in said bore, a blade formed on the end of said screw adapted to be shifted transversely relative to said shank by the turning of said screw, and a set screw near the end of said shank adapted to bear against the flattened portion of said screw to automatically set and fix said blade in the proper cutting position.

In testimony whereof I affix my signature.

CARL WIEHAGEN.